(12) United States Patent
Yamaguchi et al.

(10) Patent No.: US 6,267,213 B1
(45) Date of Patent: Jul. 31, 2001

(54) LOCK-UP DAMPER OF TORQUE CONVERTER

(75) Inventors: Mitsugu Yamaguchi, Hirakata; Takeyuki Nakamura, Shijonawate; Hideki Miura, Hirakata, all of (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/457,299

(22) Filed: Dec. 9, 1999

(30) Foreign Application Priority Data

Dec. 18, 1998 (JP) .................................................. 10-361429
Dec. 18, 1998 (JP) .................................................. 10-361430

(51) Int. Cl.$^7$ .................................................... F16H 45/02

(52) U.S. Cl. ........................................ 192/3.29; 192/212

(58) Field of Search ................................ 192/3.28, 3.29, 192/3.3, 212

(56) References Cited

U.S. PATENT DOCUMENTS

| | | | |
|---|---|---|---|
| 5,139,122 | * 8/1992 | Maeda et al. | 192/3.29 |
| 5,513,731 | 5/1996 | Matsuoka | 192/3.29 |
| 5,569,086 | 10/1996 | Fukamachi | 464/24 |
| 5,569,087 | 10/1996 | Yamamoto | 464/24 |
| 5,590,750 | * 1/1997 | Graton et al. | 192/3.29 |
| 5,617,940 | 4/1997 | Fukushima et al. | 192/70.17 |
| 5,839,182 | 11/1998 | Murata et al. | 29/464 |
| 5,848,937 | 12/1998 | Mizukami et al. | 464/64 |
| 5,857,552 | 1/1999 | Hashimoto | 192/213.21 |
| 5,857,914 | 1/1999 | Matsuoka | 464/64 |
| 5,915,511 | 6/1999 | Yamaguchi | 192/3.29 |
| 5,937,984 | 8/1999 | Kimura | 192/70.17 |

* cited by examiner

Primary Examiner—Charles A Marmor
Assistant Examiner—Saúl Rodríguez
(74) Attorney, Agent, or Firm—Shinjyu Global IP Counselors, LLP

(57) ABSTRACT

A lock-up mechanism 7 of a torque converter 1 has a piston 44 with a lock-up damper 45. The lock-up damper 45 includes a drive member and a hub flange 53 with the elastic members or torsion springs 54 operatively coupled therebetween to dampen vibrations in the torque converter 1. The drive member and the hub flange 53 both have a plurality of window holes 56d, 57d and 58 that are arranged circumferentially for receiving the corresponding torsion springs 54. The drive member includes a clutch plate 56 and a retaining plate 57. The clutch plate 56 of the drive member has a plurality of holes or cutouts 56e arranged radially outward of the window holes 56d. These holes or cutouts 56e are arranged to reduce the weight of the clutch plate 56, while maintaining the stresses around the window holes 56d of the clutch plate 56 within an allowable stress range. The retaining plate 57 of the drive member also has a plurality of holes or cutouts 57e that are arranged radially outward of the window holes 57d. These holes or cutouts 57e are arranged to reduce the weight of a retaining plate 57, while maintaining the stresses around the window holes 57d of the retaining plate 57 within an allowable stress range. The hub flange 53 of the lock-up damper 45 also include a plurality of holes or cutouts 59 that are circumferentially arranged between the window holes 58 in the hub flange 53. These holes or cutouts 59 are arranged to reduce the weight of a hub flange 53, while maintaining the stresses around the window holes 58 of the hub flange 53 within an allowable stress range.

30 Claims, 13 Drawing Sheets

LOCK-UP DAMPER OF TORQUE CONVERTER

BACKGROUND OF THE INVENTION

1. Field of the Invention

This invention generally relates to a lock-up mechanism of a torque converter. More specifically, the present invention relates to a lock-up damper arranged in a lock-up mechanism for mechanically transmitting torque from a rotatable input body to a rotatable output body of a torque converter.

2. Background Information

In general, the damper mechanism reduces vibrations transmitted from the rotatable input body to the rotatable output body, while transmitting torque from the rotatable input body to the rotatable output body. One example of such a damper mechanism is a damper arranged in a lock-up mechanism of a torque converter (hereinafter referred to as a lock-up damper).

The torque converter is a device that has three types of runners (i.e., an impeller, a turbine and a stator) and normally transmits torque via hydraulic fluid. The impeller is secured to a front cover, which is connected to the rotatable input body. Torque of the impeller is transmitted to the turbine via hydraulic fluid flowing from the impeller to the turbine through the stator. The torque is then transmitted from the turbine to the rotatable output body, which is connected to the turbine.

The lock-up mechanism is typically arranged between the turbine and the front cover. The lock-up mechanism mechanically connects the front cover to the turbine under predetermined conditions in order to transmit torque from the rotatable input body to the rotatable output body.

Such a lock-up mechanism typically includes a piston, a drive plate and a driven plate. The piston is arranged to be urged against the front cover of the torque converter. The drive plate and a driven plate is secured to the piston. The coil springs are supported partially by the drive plate. The driven plate is elastically coupled in a rotational direction to the piston via the coil springs and drive plate. The driven plate is secured to the turbine, which is connected to the rotatable output body. The drive plate, the coil springs and the driven plate further constitute components of a lock-up damper that dampens transmitted vibrations in the lock-up mechanism.

As the lock-up mechanism is activated, the piston is urged against the front cover so that the piston is initially dragged along the front cover. As the piston positively frictionally engages the front cover, torque is transmitted from the front cover to the piston. The torque is then transmitted from the piston to the turbine through the coil springs of the lock-up damper. During this process, the lock-up mechanism not only transmits the torque but also dampens torsional vibrations by providing the lock-up mechanism with coil springs. The torsional vibrations are dampened as the coil springs are repeatedly compressed and expanded between the drive plate and the driven plate. When the coil springs are compressed and expanded, the coil springs slide along the drive plate, which is secured to the piston.

Since there is a strong market demand for downsizing of the torque converter, it is desirable to have a smaller lock-up mechanism. To meet this requirement, in many cases, the drive plate and the driven plate are arranged to oppose each other, and the coil springs are arranged in receiving windows formed in the drive plate and the driven plate. Specifically, the opposite ends of the coil springs engage the opposite circumferential end surfaces of the corresponding receiving window of the drive plate. Also the opposite circumferential end surfaces of the corresponding receiving window of the driven plate engage the opposite ends of the coil springs. Thus, the coil springs elastically couple the drive plate and the driven plate in a circumferential direction.

When the torque converter is rotated, a centrifugal force is applied to the components of the lock-up damper. In addition to the centrifugal force, the drive plate and the driven plate also receive the reaction forces applied from the coil springs in a circumferential direction. The drive plate and driven plate should have enough strength to prevent any damage to them when these centrifugal and circumferential forces are applied to the plates.

As described above, the drive plate and the driven plate should have enough strength to withstand the described forces. It is also desired to reduce the weight of the drive plate and the weight of the driven plate to reduce the weight of the torque converter. However, since these plates have the receiving windows for receiving the coil springs as described before, relatively high stresses are naturally occur around the receiving windows of the drive plate and the driven plate.

In view of the above, there exists a need for a lock-up damper which overcomes the above mentioned problems in the prior art. This invention addresses this need in the prior art as well as other needs, which will become apparent to those skilled in the art from this disclosure.

SUMMARY OF THE INVENTION

Accordingly, it is an objective of the present invention to provide a lock-up damper that includes a drive plate (input member) and a driven plate (output member) both having reduced weight, while maintaining allowable stress values around their receiving windows (receiving openings).

In accordance with one aspect of the present invention, a lock-up damper is arranged in a lock-up mechanism of a torque converter for mechanically transmitting torque from the rotatable input body to a rotatable output body and includes an input member, an output member and an elastic member. The input member receives torque from the rotatable input body. The output member outputs torque to the rotatable output body. The elastic member is arranged between the input member and the output member. The input member and the output member both include a plurality of receiving openings. These receiving openings are arranged for receiving the elastic member. At least one of the input member and the output member has holes or cutouts positioned radially outward of the receiving openings for the purpose of weight reduction.

In accordance with another aspect of the present invention, a torque converter including a lock-up damper is provided such that when the torque converter is rotated, the centrifugal force is applied to the input member, the output member and the elastic member. As the lock-up mechanism is activated, the input member and the output member rotate or pivot relative to each other. This results in vibrations being transmitted from the rotatable input body to the rotatable output body. The elastic member or coil springs dampens these vibrations. At this point, the reaction force from the elastic member is applied to both the input member and the output member.

Therefore, the centrifugal force that is proportional to the weights of the input member and the output member is applied to both the input member and the output member.

The centrifugal force of the elastic member at the respective receiving openings of the input member and the output member that presses radially outwardly on the receiving openings is also applied to both the input member and the output member. Finally, the reaction force from the elastic member is applied to both the input member and the output member. The input member and the output member must have enough strength to withstand these forces. It is especially important to limit the stresses within an allowable range around the receiving openings, where the maximum stress is readily generated by stress concentration.

In accordance with another aspect of the lock-up damper of the present invention, at least one of the input member and the output member has holes or cutouts positioned radially outwardly of the receiving openings for the elastic members. These holes or cutouts are positioned at locations to reduce the weight of the lock-up damper without substantially reducing the strength. With this arrangement, the weight of the lock-up damper is reduced. The presence of holes or cutouts may adversely reduce the rigidity at locations radially outward of the respective receiving openings, so that more stresses could be applied around the respective receiving openings from the elastic member. However, the holes or cutouts also reduce the weight at locations radially outward of the receiving openings, so that the centrifugal force that is proportional to the weight of this radially outward area is reduced. Therefore, the amount of stress applied to the peripheral region of the receiving openings by this centrifugal force is accordingly reduced. As a result, the total amount of stresses applied around the receiving openings is not substantially increased. Since the area radially outward of the receiving openings is relatively distant from a rotational center and therefore contributes to the relatively large centrifugal force, it is advantageous to reduce the weight of the area radially outward of the receiving openings.

Therefore, with this arrangement of the inventive lock-up damper, the weight of the input member and/or the weight of the output member can be advantageously reduced by the presence of holes or cutouts arranged at locations radially outward of the receiving openings while keeping stresses around the receiving openings within an allowable range. As a result, the weight of the lock-up damper and, therefore, the weight of the torque converter can be reduced without reducing their strengths.

In accordance with another aspect of the present invention, a lock-up damper is provided wherein at least one of the input member and the output member has the cutouts. An area of a cutout is preferably more than 80% of an area of a respective radially inward receiving opening.

The damping characteristics of the lock-up dampers can often be improved by providing a larger maximum relative rotational angle between the input member and the output member. This larger maximum relative rotational angle is often achieved by arranging the receiving openings close to a rotational center as much as possible, and providing a circumferentially short elastic member at the receiving openings. This will result in a relatively large area located radially outward of the receiving openings of the input member and/or the output member.

In this arrangement, as mentioned above, the respective areas of the cutouts, which are arranged radially outward of the receiving openings, are preferably set to be more than 80% of the area of the respective radially inward receiving openings. In this way, the weight of the input member and/or the output member having the cutouts can be advantageously reduced. However, the stress around the respective receiving openings due to the centrifugal force, which is proportional to the weight of the input member and/or the output member having the cutouts, is effectively minimized by reducing the weight of the input member and/or the weight of the output member at locations where additional weight is unnecessary or excessive in terms of retaining satisfactory strength of the input member and/or the output member.

In accordance with another aspect of the present invention, a lock-up damper is provided wherein at least one of the input member and the output member has holes. An area of a hole is preferably more than 25% of an area of a respective radially inward receiving opening.

As mentioned above, the damping characteristics of the lock-up dampers can be often improved by providing a larger maximum relative rotational angle between the input member and the output member. This larger maximum relative rotational angle is often achieved by arranging the receiving openings close to a rotational center as much as possible, and providing a circumferentially short elastic member at the receiving openings. This will result in a relatively large area located radially outward of the receiving openings of the input member and/or the output member.

In this arrangement, as mentioned above, the respective areas of the holes, which are arranged radially outward of the receiving openings are preferably set to be more than 25% of the area of the respective radially inward receiving openings. In this way, the weight of the input member and/or the weight of the output member having the holes can be advantageously reduced. However, the stresses around the receiving openings due to the centrifugal force, which is proportional to the weight of the input member and/or the weight of the output member having the holes, are effectively minimized by reducing the weight of the input member and/or the output member at locations where additional weight is unnecessary or excessive in terms of retaining satisfactory strength of the input member and/or the output member. The input member and/or the output member having the holes may typically have more rigidity than those having the cutouts. Therefore, the input member and/or the output member having the holes may be made thinner than those having the cutouts while retaining the satisfactory strength thereof In accordance with another aspect of the present invention, a lock-up damper is provided, wherein at least one of the input member and the output member having the holes or cutouts is an annular member having an annular continuous section. The annular continuous section continuously extends completely around the annular member and is radially positioned between the holes or cutouts and the receiving openings.

In this arrangement, as described above, at least one of the input member and the output member having the holes or cutouts has an annular shape. In this way, a lightweight input member and/or the lightweight output member can be advantageously provided while retaining the satisfactory strength-thereof. Furthermore, since the annular continuous section is radially arranged between the holes or cutouts, which are provided for the purpose of weight reduction, and the receiving openings, which tend to have large stresses around them, the stresses around the receiving openings can be effectively limited.

In accordance with another aspect of the present invention a lock-up damper is provided, wherein at least one of the input member and the output member having the holes or cutouts is includes two disk-like members. Preferably, each of the two disk-like members has the holes or cutouts.

In accordance with another aspect of the present invention a lock-up damper is provided, wherein each of the two disk-like members has a plurality of receiving openings and also a projection. The projection is positioned around the respective receiving openings for retaining the elastic member.

In this arrangement, since the elastic member is received in the opposing receiving openings of the disk-like members, the opposing end surfaces of each receiving opening engage with the elastic member, so that the elastic member can be more stably held. Furthermore, since the elastic member is further held by the projection positioned around the respective receiving openings of each disk-like member, the elastic member can be held more stable.

In accordance with another aspect of the present invention a lock-up damper is arranged in a lock-up mechanism of a torque converter for mechanically transmitting torque from the rotatable input body to a rotatable output body and includes an input member, an output member and an elastic member. The input member receives torque from the rotatable input body. The output member outputs torque to the rotatable output body. The elastic member is arranged between the input member and the output member. The input member and the output member both include a plurality of receiving openings that are arranged circumferentially for receiving the elastic member. Furthermore, at least one of the input member and the output member has a hole that is circumferentially arranged between the receiving openings.

In accordance with another aspect of the present invention, as the torque converter including the lock-up damper is rotated, the centrifugal force is applied to the input member, the output member and the elastic member. As the lock-up mechanism is activated, the input member and the output member rotate or pivot relative to each other, and vibrations transmitted from the rotatable input body to the rotatable output body are dampened by the elastic member. At this point, the reaction force from the elastic member is applied to both the input member and the output member.

Therefore, the centrifugal force that is proportional to the weights of the input member and the output member, the centrifugal force of the elastic member at the respective receiving openings of the input member and the output member that presses radially outwardly on the receiving openings, and the reaction force from the elastic member are applied to both the input member and the output member. The input member and the output member must have enough strength to withstand these forces. It is especially important to limit the stresses within an allowable range around the receiving openings, where the maximum stress is readily generated by stress concentration.

In the lock-up damper of the present invention, as described above, at least one of the input member and the output member has the hole that is circumferentially arranged between the receiving openings. With this arrangement, the weight of the lock-up damper is reduced. The presence of the hole may adversely reduce the rigidity at the corresponding intermediate region between the adjacent receiving openings, so that more stresses could be applied around the respective receiving openings from the elastic member. However, the hole also reduces the weight of the intermediate region, so that the centrifugal force that is proportional to the weight of this intermediate region is reduced. Therefore, the amount of stress applied to the peripheral region of the receiving openings by this centrifugal force is accordingly reduced. As a result, the total amount of stresses applied around the receiving openings is not substantially increased or is even reduced in some cases. Since a relatively large part of the stresses at corners of each receiving opening, which are adjacent to the corresponding intermediate region between the adjacent receiving openings, is induced by the centrifugal force of the intermediate region, these stresses can be reduced by providing the hole in the intermediate region.

Therefore, with this arrangement of the inventive lock-up damper, the weight of the input member and/or the weight of the output member can be advantageously reduced by providing the hole circumferentially arranged between the receiving openings while keeping stresses around the receiving openings within an allowable range. As a result, the weight of the lock-up damper and, therefore, the weight of the torque converter can be reduced without reducing their strengths. Furthermore, if it is possible to reduce the maximum stress of the input member and/or the output member by providing the hole. Additionally, the thickness of the input member and/or the thickness of the output member having the hole can be reduced for the amount that corresponds with the reduced maximum stress to achieve further weight reduction.

In accordance with another aspect of the present invention, a lock-up damper is provided, wherein the input member or the output member that has the hole is an annular member, which is restricted from radial movement at an inner peripheral region thereof, the inner peripheral region arranged radially inward of the receiving openings.

In this arrangement, since the input member or the output member that has the hole is restricted from radial movement at an inner peripheral region thereof, the peripheral areas of the respective receiving openings, especially the corners of the respective receiving openings, receive the stress induced by the centrifugal force of the intermediate region. Therefore, in such an arrangement, the advantages of the hole provided in the corresponding intermediate region are enhanced.

In accordance with another aspect of the present invention, a lock-up damper is provided, wherein the hole in the input member or the output member is arranged at an outer peripheral part of an intermediate region that is circumferentially located between the receiving openings.

In this arrangement, the hole is arranged at the outer peripheral part of the intermediate region where the effect of the centrifugal force is greater than that of any other part of the intermediate region. Therefore, the centrifugal force of the intermediate region is reduced to thereby reduce stresses at the peripheral region of the receiving opening while the reduction of the rigidity due to the hole is minimized.

In accordance with another aspect of the present invention, a lock-up damper is provided, wherein the input member or the output member that has the hole is an annular member having an annular outer peripheral section. This annular outer peripheral section continuously extends completely around the annular member and is positioned radially outward of the hole.

In this arrangement, since the annular outer peripheral section continuously extends completely around the annular member and is positioned radially outward of the receiving openings and the hole, the input member or the output member having the hole can have satisfactory strength while achieving the reduction in weight.

In accordance with another aspect of the present invention, a lock-up damper is provided, wherein the hole is arranged in the output member. Furthermore, the output member is an annular member that has an inner peripheral region, which is positioned radially inward of the receiving openings and is connected to the output member.

These and other objects, features, aspects and advantages of the present invention will become readily apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
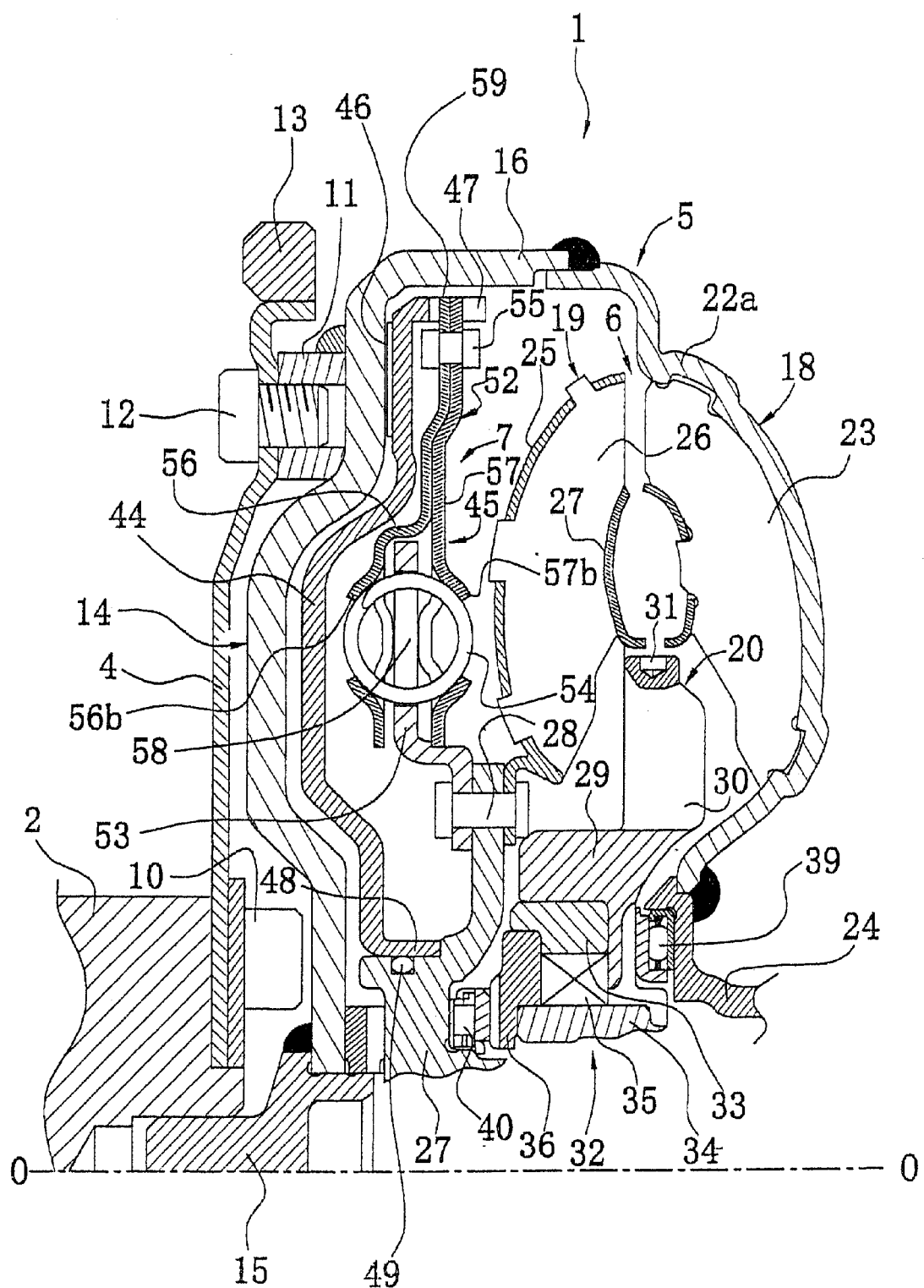
FIG. 1 is a front longitudinal cross-sectional view of a torque converter that includes a lock-up damper in accordance with an embodiment of the present invention.

Referring initially to FIG. 1. a simplified longitudinal cross-sectional view of a torque converter 1 is illustrated in accordance with an embodiment of the present invention. The torque converter 1 is a device that transmits torque from a crankshaft 2 of an engine (not shown) to an input shaft of a transmission (not shown). The engine is arranged on the left side of the torque converter 1 of FIG. 1, and the transmission (not shown) is arranged on the right side of the torque converter of FIG. 1. A rotational axis of the torque converter 1 is indicated with a line O—O in FIG. 1.

The torque converter 1 mainly includes a flexible plate 4 and a main body 5. The flexible plate 4 is a disk-like thin plate element for transmitting torque and absorbing bending vibrations that are transmitted from the crankshaft 2 to the torque converter 1. The main body 5 of the torque converter 1 is basically includes a torus 6 and a lock-up mechanism 7. Torus 6 includes three different runners, i.e., an impeller 18, a turbine 19 and a stator 20.

A front cover 14 is a disk-like member and is arranged adjacent to the flexible plate 4. A center boss 15 is secured to an inner peripheral region of the front cover 14 by welding. The center boss 15 is an axially extending cylindrical member and is inserted into a center hole of the crankshaft 2.

An inner peripheral region of the flexible plate 4 is secured to the crankshaft 2 by a plurality of bolts 10 that are circumferentially and equidistantly arranged around the inner peripheral region of the flexible plate 4. An outer peripheral region of the front cover 14 has a plurality of nuts 11 secured thereto. Nuts 11 are circumferentially and equidistantly arranged along and the outer peripheral region of the front cover 14 on the engine side thereof (i.e., on the left side of FIG. 1). Bolts 12 are threadedly engaged with the corresponding nuts 11 to secure an outer peripheral region of the flexible plate 4 to the front cover 14. An annular inertia member 13 is secured to the outer peripheral region of the flexible plate 4.

An outer peripheral tubular section 16 is arranged at the outer peripheral region of the front cover 14 and extends axially from the front cover 14 toward the transmission side of the torque converter 1 (i.e., the right side of FIG. 1) and has a distal end. An outer peripheral edge of an impeller shell 22a of the impeller 18, which will be described later in more detail, is secured to the distal end of the outer peripheral tubular section 16 by welding. Therefore, the front cover 14 and the impeller 18 define a hydraulic fluid chamber that is filled with hydraulic fluid.

The impeller 18 mainly includes the impeller shell 22a, a plurality of impeller blades 23 and an impeller hub 24. The impeller blades 23 are secured to an interior surface of the impeller shell 22a, while the impeller hub 24 is secured to an inner peripheral region of the impeller shell 22a.

The turbine 19 is axially opposed to the impeller 18 on the engine side thereof within the hydraulic fluid chamber. The turbine 19 mainly includes a turbine shell 25, a plurality of turbine blades 26 and a turbine hub 27. The turbine blades 26 are secured to a surface of the turbine shell 25 on the impeller side thereof. An inner peripheral region of the turbine shell 25 is secured to an outer peripheral flange of the turbine hub 27 by a plurality of rivets 28. An inner peripheral region of the turbine hub 27 is connected to an input shaft of a transmission (not shown) in a non-rotatable manner relative to the input shaft of the transmission.

The stator 20 is a member that adjusts return flow of the hydraulic fluid from the turbine 19 to the impeller 18. The stator 20 is a single member that is molded from resin, aluminum alloy or the like. The stator 20 is arranged between the inner peripheral region of the impeller 18 and the inner peripheral region of the turbine 19. The stator 20 mainly includes an annular carrier 29, a plurality of stator blades 30, which are arranged at an outer peripheral surface of the carrier 29, and an annular core 31, which is secured to distal ends of the stator blades 30. A fixed shaft (not shown) supports the carrier 29 via a one-way clutch 32.

The one-way clutch 32 includes an outer race 33, an inner race 34 and a plurality of members 35. The outer race 33 is secured to the carrier 29, while the inner race 34 is secured to the fixed shaft (not shown). The members 35 are arranged between the outer race 33 and the inner race 34. A thrust bearing 39 is arranged between the carrier 29 and the impeller hub 24. An annular engaging member 36 is axially arranged at the outer race 33 of the one-way clutch 32 on the engine side thereof. The annular engaging member 36 prevents dislodgment of the members 35 of the one-way clutch 32 in an axial direction on the engine side thereof. Carrier 29 prevents dislodgment of members 35 of the one-way clutch 32 in an axial direction on the transmission side thereof. A thrust bearing 40 is arranged between the engaging member 36 and the turbine hub 27.

LOCK-UP MECHANISM

Figure 2:
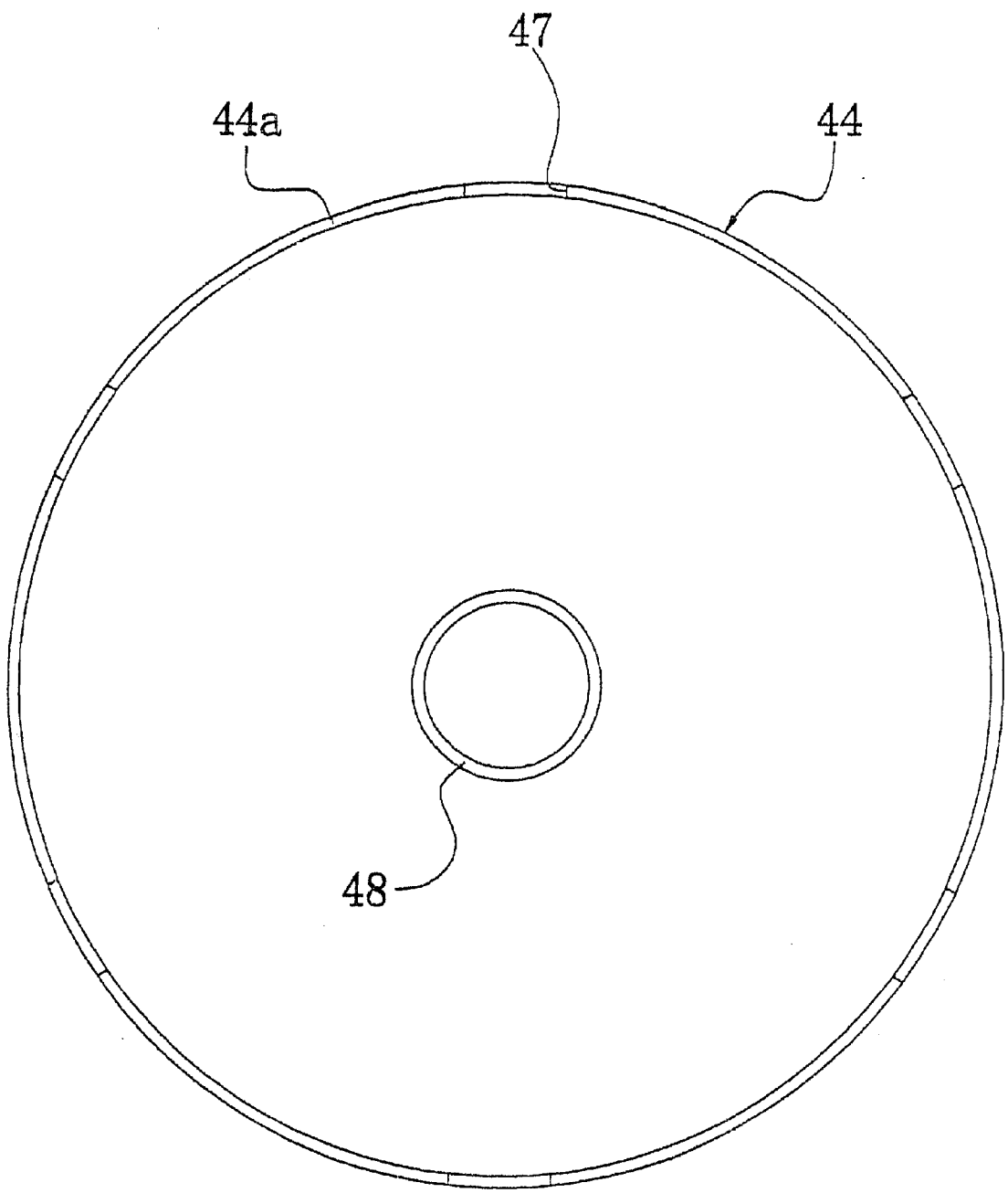
FIG. 2 is a right side elevational view of a piston of the torque converter illustrated in FIG. 1 in accordance with an embodiment of the present invention.
Figure 3:
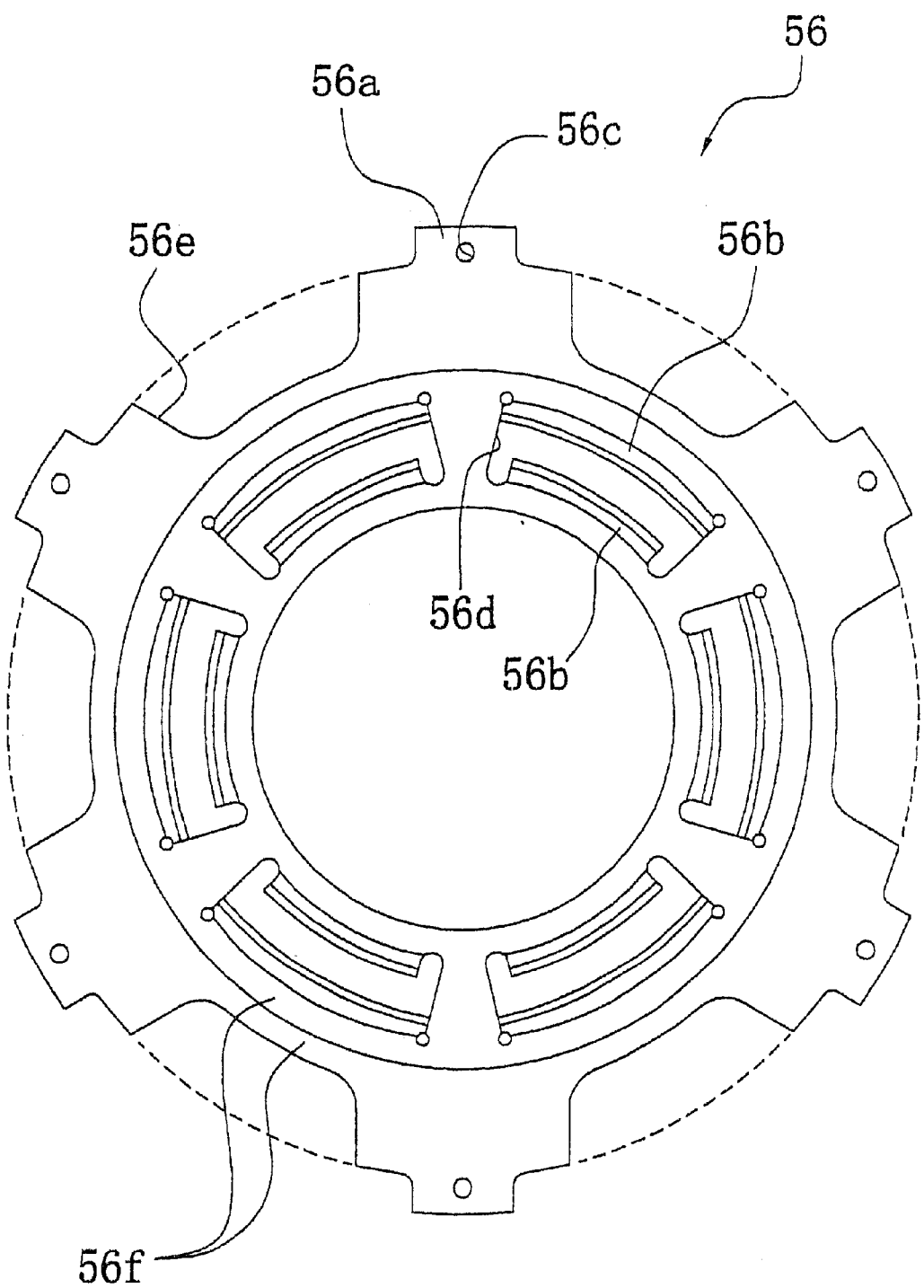
FIG. 3 is a right side elevational view of a clutch plate of the torque converter illustrated in FIG. 1 in accordance with an embodiment of the present invention.
Figure 4:
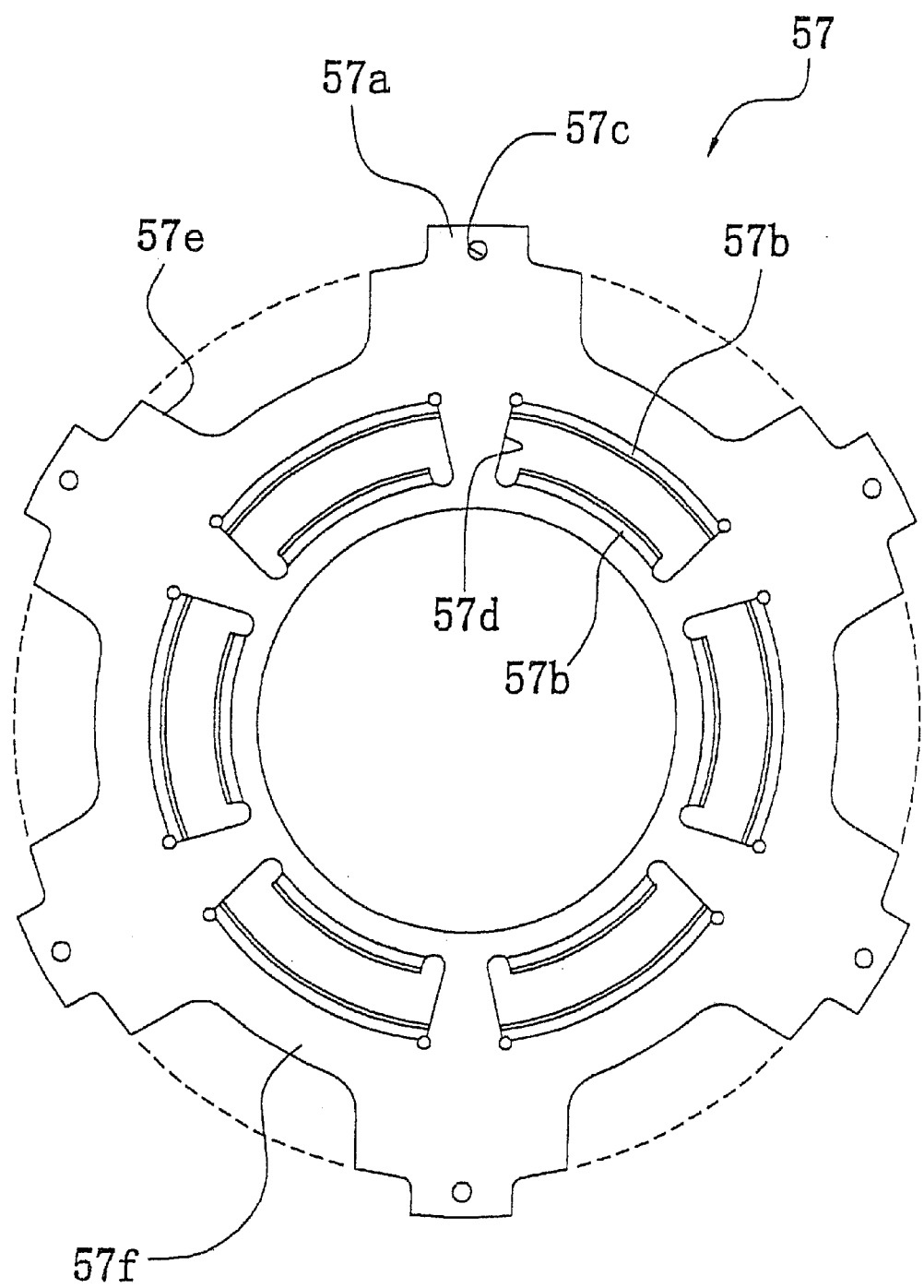
FIG. 4 is a right side elevational view of a retaining plate of the torque converter illustrated in FIG. 1 in accordance with an embodiment of the present invention.
Figure 5:
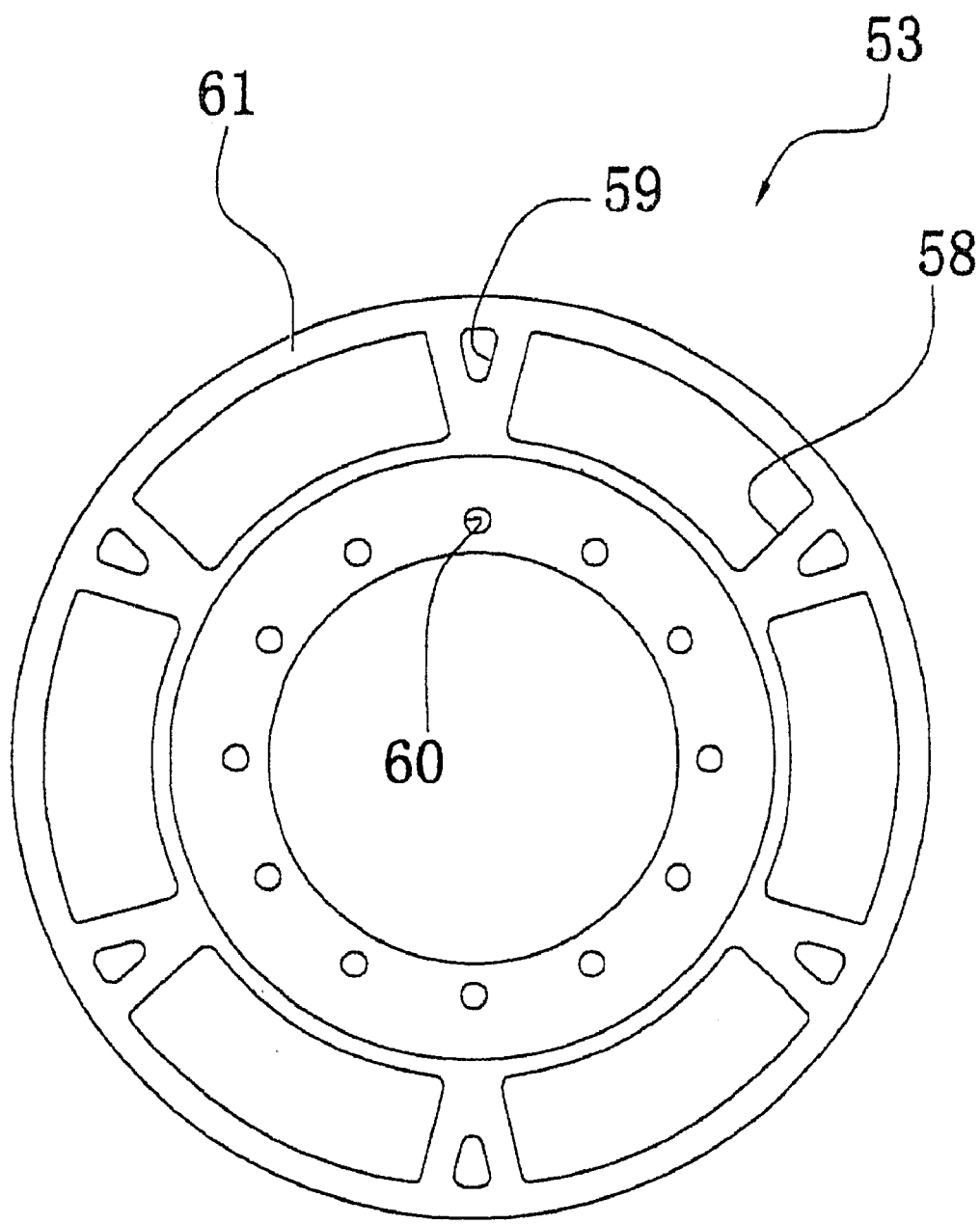
FIG. 5 is a right side elevational view of a hub flange of the torque converter illustrated in FIG. 1 in accordance with an embodiment of the present invention.

The lock-up mechanism will now be described in more detail. The lock-up mechanism 7 mainly includes a piston 44 and a lock-up damper 45. FIG. 2 is a right side elevational view of the piston 44 taken from the transmission side of the torque converter 1 illustrated in FIG. 1. FIGS. 3, 4 and 5 show right side elevational views of a clutch plate 56, a retaining plate 57 and a hub flange 53, respectively, also taken from the transmission side of the torque converter 1 illustrated in FIG. 1. The clutch plate 56, the retaining plate 57 and the hub flange 53 constitute the main components of the lock-up damper 45, and will now be described in more detail below.

The piston 44 is a disk-like member that is axially arranged on the transmission side of the front cover 14. The piston 44 is also arranged relative to and adjacent to a side surface of the front cover 14. The piston 44 has an annular recess at a radially intermediate section of the piston 44 (see FIG. 1). The annular recess is axially recessed toward the engine side of the torque converter 1 by a drawing process. The front cover 14 has a similar annular recess along the recess of the piston 44. The similar annular recess of the front cover 14 is also axially recessed toward the engine side of the torque converter 1. An inner peripheral tubular section 48 is arranged at an inner peripheral region of the piston 44 and extends axially toward the transmission side of the piston 44. The inner peripheral tubular section 48 is supported by an outer peripheral surface of the turbine hub 27 in such a manner that the inner peripheral tubular section 48 is freely rotatable and is axially moveable relative to the turbine hub 27. An axial end of the inner peripheral tubular section 48 located on the transmission side thereof abuts against an outer peripheral flange of the turbine hub 27. Therefore, inner peripheral tubular section 48 is restricted from axial movement toward the transmission side of the torque converter 1. A seal ring 49 is arranged in a groove that is formed on the outer peripheral surface of the turbine hub 27.

An outer peripheral region of the piston 44 acts as a clutch coupler that shifts the lock-up mechanism 7 between an operational position and a non-operational position. A friction facing 46 (see FIG. 1) is adhered to the engine side of the outer peripheral region of the piston 44. The friction facing 46 is opposed to a flat annular friction surface that is formed at a side surface of the outer peripheral region of the front cover 14 and on the transmission side thereof. A tubular section 44a is formed on the outer peripheral region of the piston 44 to extend from the transmission side of the piston 44 as best seen in FIG. 2. The tubular section 44a has a plurality of slots 47. These slots 47 are circumferentially and equidistantly arranged in the tubular section 44a.

The lock-up damper 45 includes a drive member (input member) 52, a driven member (output member) and a plurality of torsion springs (elastic members) 54. The drive or input member 52 includes a clutch plate 56 and a retaining plate 57. The driven or output member is mainly comprised of the hub flange 53.

The clutch plate 56 and the retaining plate 57 are preferably rigid annular disk like members that are arranged to be axially adjacent to one another to form the drive member 52. In other words, clutch plate 56 and retaining plate 57 are arranged side by side with an axially space located therebetween. The hub flange 53 is located in this axially space between clutch plate 56 and retaining plate 57.

Preferably, the clutch plate 56 and the retaining plate 57 each have six radially outwardly extending projections 56a and 57a, respectively. Outwardly extending projections 56a and 57a are located along the outer peripheral regions of the clutch plate 56 and the retaining plate 57. Clutch plate 56 and retaining plate 57 are arranged so that projections 56a axially oppose projections 57a. The opposing projections 56a and 57a are engaged together and are secured together by a plurality of rivets 55 (see FIG. 1). Rivets 55 extend through a plurality of corresponding holes 56c and 57c formed in the projections 56a and 57a, respectively to couple clutch plate 56 and retaining plate 57 together. The opposing projections 56a and 57a circumferentially engage with the corresponding slots 47 formed in the tubular section 44a of the piston 44. Projections 56a and 57a act as a torque input section to which torque is inputted or transmitted from the piston 44 via slots 47 to the projections 56a and 57a. Because of this engagement, the piston 44 and the drive member 52 (i.e., clutch plate 56 and retaining plate 57) rotate together in a rotational direction about axis 0—0. However, this type of engagement also allows relative movement between the piston 44 and the drive member 52 in an axial direction.

The inner peripheral region of the clutch plate 56 and the inner peripheral region of the retaining plate 57 are axially separated from each other. This separation is created by the inner peripheral region of the clutch plate 56 being recessed toward the front cover 14 by a drawing process (see FIG. 1).

A plurality of window holes (receiving openings) 56d and 57d for receiving the corresponding torsion springs 54 are formed in the inner peripheral region of the clutch plate 56 and the inner peripheral region of the retaining plate 57, respectively. Preferably, clutch plate 56 has six window holes 56d and retaining plate 57 has six axially opposed window holes 57d. A plurality of cut and bent sections (projections) 56b and 57b which are cut and then bent outwardly, are arranged at both radially inward and outward edges of each of the window holes 56d and 57d, respectively, as seen in FIGS. 1, 3 and 4. More specifically, each window hole 56d preferably has two cut and bent sections 56b and each window hole 57d preferably has two cut and bent sections 57d. The cut and bent sections 56b are bent toward the engine side of the torque converter 1, and the cut and bent sections 57b are bent toward the transmission side of the torque converter 1. These cut and bent sections 56b and 57b restrict axial movement of corresponding torsion springs 54 arranged in corresponding window holes 56d and 57d.

Both the clutch plate 56 and the retaining plate 57 are notched or stepped at radially outward positions of the window holes 56d and 57d between projections 56a and 57a, respectively, to form notched regions. A plurality of additional steps or outer peripheral cutouts 56e and 57e are then formed in these notched regions. Preferably, clutch plate 56 has six cutouts 56e and retaining plate 57 has six cutouts 57e. Cutouts 56e and 57e are located radially outward of window holes 56d and 57d, and are formed in the notched regions. Specifically, intermediate sections located between the projections 56a and 57a of the clutch disk 56 and retaining plate 57, respectively, are first notched away from projections 56a and 56b to form corresponding disks (each of these disks is shown with dotted lines in FIGS. 3 and 4). Cutouts 56e and 57e are then formed radially inwardly from these dotted line disks in the intermediate sections. Preferably, an area of each of the cutouts 56e and 57e (i.e., the area surrounded by a solid line and a dotted arc portion of one of the dotted line disks as best seen in FIGS. 3 and 4) is about 80 to 100% of an area of each of the corresponding window holes 56d and 57d located radially inwardly of the cutouts 56e and 57e.

The hub flange 53 is preferably a rigid annular disk like member that is axially arranged between the inner peripheral region of the clutch plate 56 and the inner peripheral region of the retaining plate 57 as seen in FIG. 1. An inner peripheral region of the hub flange 53 is secured to the outer peripheral flange of the turbine hub 27 by a plurality of rivets 28 that extend through a plurality of circular holes 60 formed in the inner peripheral region of the hub flange 53 as seen in FIGS. 1 and 5. An annular outer peripheral section 61, which extends continuously and circumferentially around the perimeter of hub flange 53, is formed in an outer peripheral region of the hub flange 53. Additionally, the hub flange 53 is provided with a plurality of window holes (receiving openings) 58 that are arranged to correspond with the locations of the plurality of window holes 56d and 57d of the clutch plate 56 and the retaining plate 57, respectively. Preferably, hub flange 53 has six window holes 58 to correspond to the six window holes 56d and six window holes 57d. Each of the window holes 58 is an elongated hole that extends in a circumferential direction. The hub flange 53 is also provided with additional openings (holes) 59 that are circumferentially arranged between the window holes 58 to reduce weight of and stresses on the hub flange 53. Preferably, there are six openings 59 provided between the window holes 58 of the hub flange 53. Each of the openings 59 is arranged at an outer peripheral part of an intermediate region and circumferentially between adjacent window holes 58, preferably in an alternating fashion. Furthermore, these window holes 58 and openings 59 are aligned with an inner peripheral region of the annular outer peripheral section 61 of the hub flange 53.

The torsion springs 54 are received in circumferentially corresponding window holes 56d, 57d and 58 and axially positioned by the cut and bent sections 56b and 57b of the window holes 56d and 57d. Each of the torsion springs 54 is a circumferentially extending coil spring, which has opposing circumferential ends. The opposing circumferential ends of the torsion springs 54 are supported by the opposing circumferential end surfaces of the window holes 56d, 57d and 58.

OPERATION OF THE TORQUE CONVERTER

Operation of the inventive torque converter will now be described in more detail. When torque is transmitted from the engine (not shown) to the crankshaft 2, the torque is transmitted to the front cover 14 through the flexible plate 4, and then to the impeller 18 from the front cover 14. The hydraulic fluid, which is driven by the impeller blades 23 of the impeller 18, rotates the turbine 19. The torque of the turbine 19 is outputted to the input shaft of the transmission (not shown) through the turbine hub 27. The hydraulic fluid flowing from the turbine 19 to the impeller 18 passes through the stator 20 toward the impeller 18.

When the lock-up mechanism 7 is placed under predetermined conditions that allow activation of the lock-up mechanism 7, the hydraulic fluid residing in a space between the front cover 14 and the piston 44 is drained from the inner peripheral side of the space. The piston 44 is then moved toward the front cover 14 due to hydraulic pressure difference. Therefore, the friction facing 46 is urged against the friction surface of the front cover 14, and the torque is mechanically transmitted from the front cover 14 to the turbine hub 27 through the lock-up mechanism 7.

OPERATION OF THE LOCK-UP DAMPER

In the lock-up mechanism 7, the torque is transmitted from the piston 44 to the clutch plate 56 and the retaining plate 57 (drive member 52). The torque from these plates 56 and 57 is transmitted to the hub flange 53 through the torsion springs 54 and is then transmitted to the turbine hub 27 from the hub flange 53 (driven member). During this process, certain torque fluctuations (vibrations) are absorbed or dampened by expansion and compression of the torsion springs 54 of the lock-up damper 45.

Characteristics of the lock-up damper 45 (i.e., clutch plate 56, retaining plate 57, torsion springs 54 and hub flange 53) in accordance with this embodiment will now be described. As described above, the inventive hub flange 53 (FIGS. 5 and 8) of the lock-up damper 45 has a plurality of openings 59, which are not found in the prior art hub flange shown in FIGS. 6 and 7. Because of the presence of these openings 59, the weight of the hub flange 53, the lock-up damper 45 and, therefore, the weight of the torque converter 1 are respectively reduced. Additionally, as described in greater detail below, in comparison to a maximum principal stress value of the prior art hub flange without the openings 59, providing the openings 59 in the inventive hub flange 53 contributes to achieving a smaller maximum principal stress value on the hub flange 53.

Specifically, during operation (rotation) of the lock-up damper 45, centrifugal force is applied to both the hub flange 53 and the torsion springs 54. Additionally, the forces of the torsion springs 54 are applied to the peripheral surfaces of the corresponding window holes 58 of the hub flange 53. More specifically, the centrifugal force that is proportional to the weight of the hub flange 53 is applied to the hub flange 53. The centrifugal force of the torsion springs 54 that outwardly press the outer peripheral surfaces of the corresponding window holes 58 is also applied to the hub flange 53. Finally, the circumferential reaction forces of the torsion springs 54 that press the circumferential end surfaces of the corresponding window holes 58 is also applied to the hub flange 53.

Figure 6:
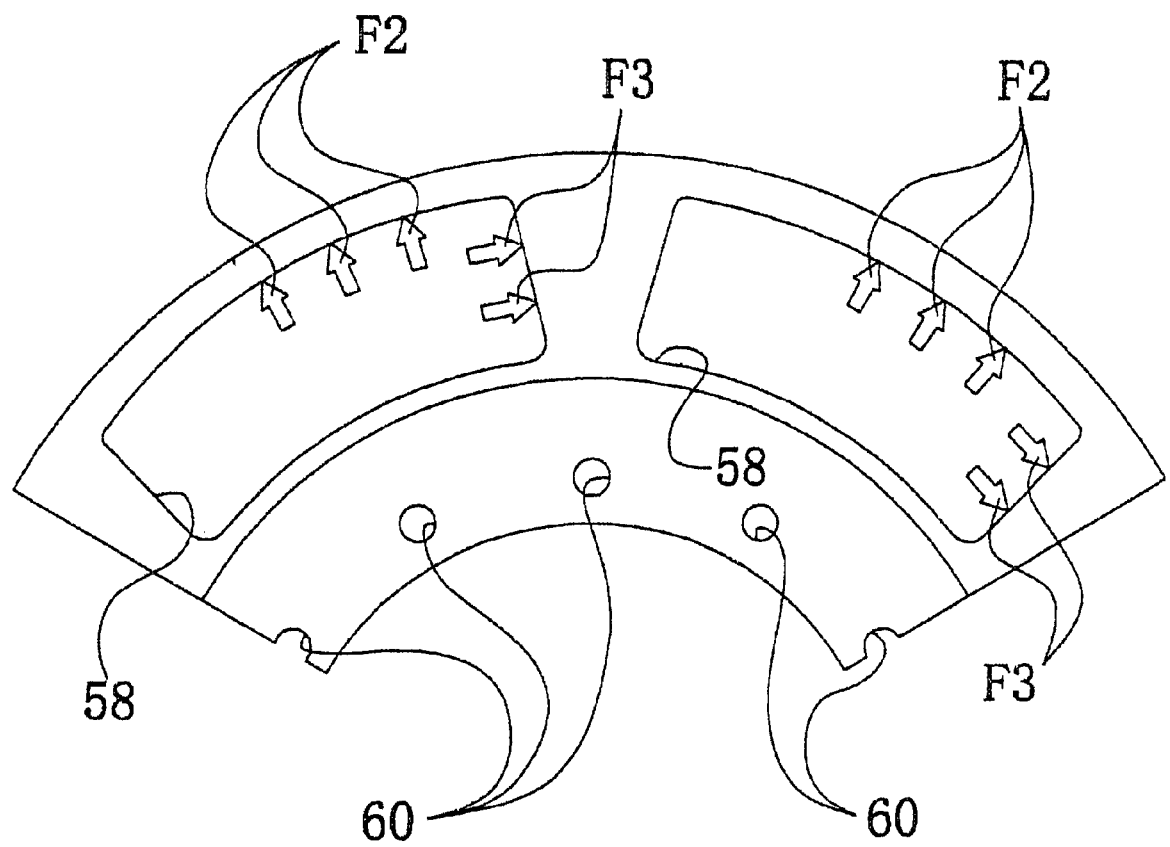
FIG. 6 is an enlarged partial right side elevational view of a prior art hub flange showing conditions of strength analysis.
Figure 8:
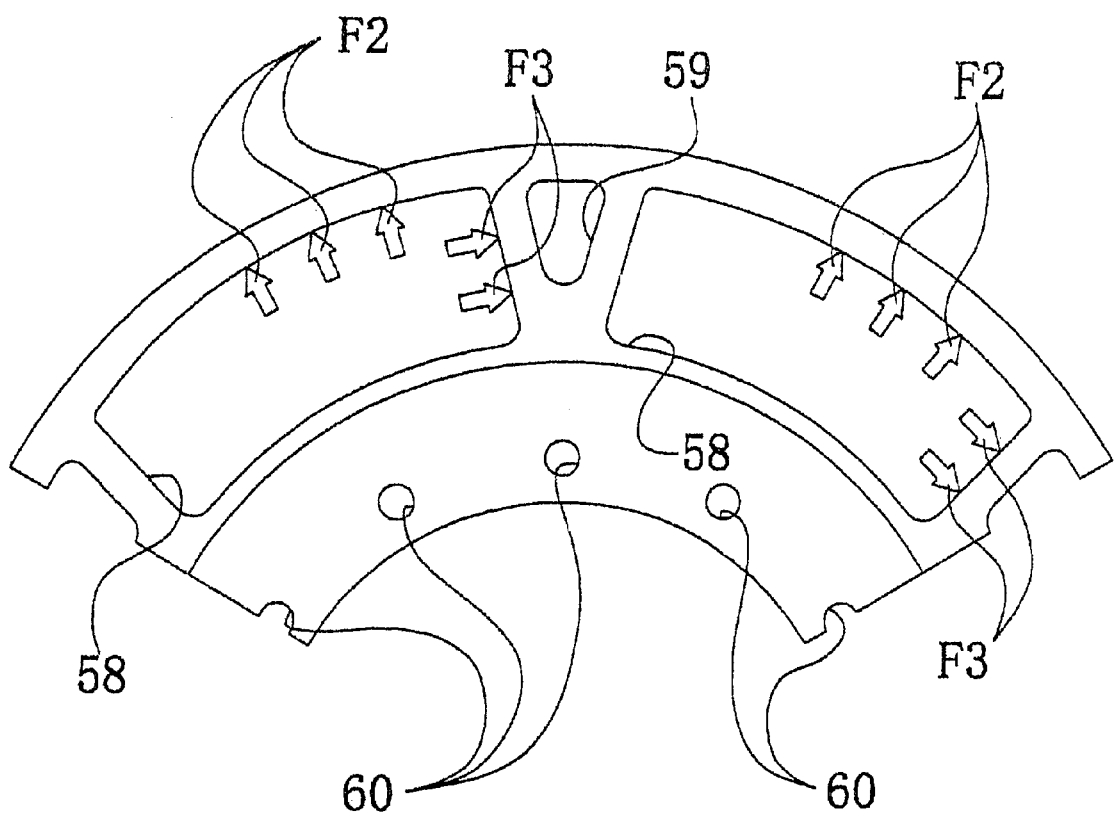
FIG. 8 is an enlarged partial right side elevational view of the hub flange illustrated in FIG. 5 in accordance with an embodiment of the present invention showing conditions of strength analysis.

Strength analysis according to a finite element method was conducted with the above described load conditions for both the prior art hub flange having no openings 59 and the inventive hub flange 53 having the openings 59. FIGS. 6 and 8 show the load conditions of the strength analysis for these hub flanges, respectively. Specifically, in both FIGS. 6 and 8, symmetrical load conditions are applied to the interfaces (i.e., the left and right circumferential end surfaces of each hub flange portion) while each hub flange is fixed at the circular holes 60. Additionally, the loads indicated with arrows F2, F3 and the centrifugal force that is proportional to the weight of each hub flange is applied to the respective hub flanges. The load indicated with the arrows F2 represents the centrifugal force of the torsion springs 54 that presses outwardly against the outer peripheral surfaces of the corresponding window holes 58. The load indicated with the arrows F3 represents the reaction forces of the torsion springs 54 that press the circumferential end surfaces of the corresponding window holes 58.

Figure 7:
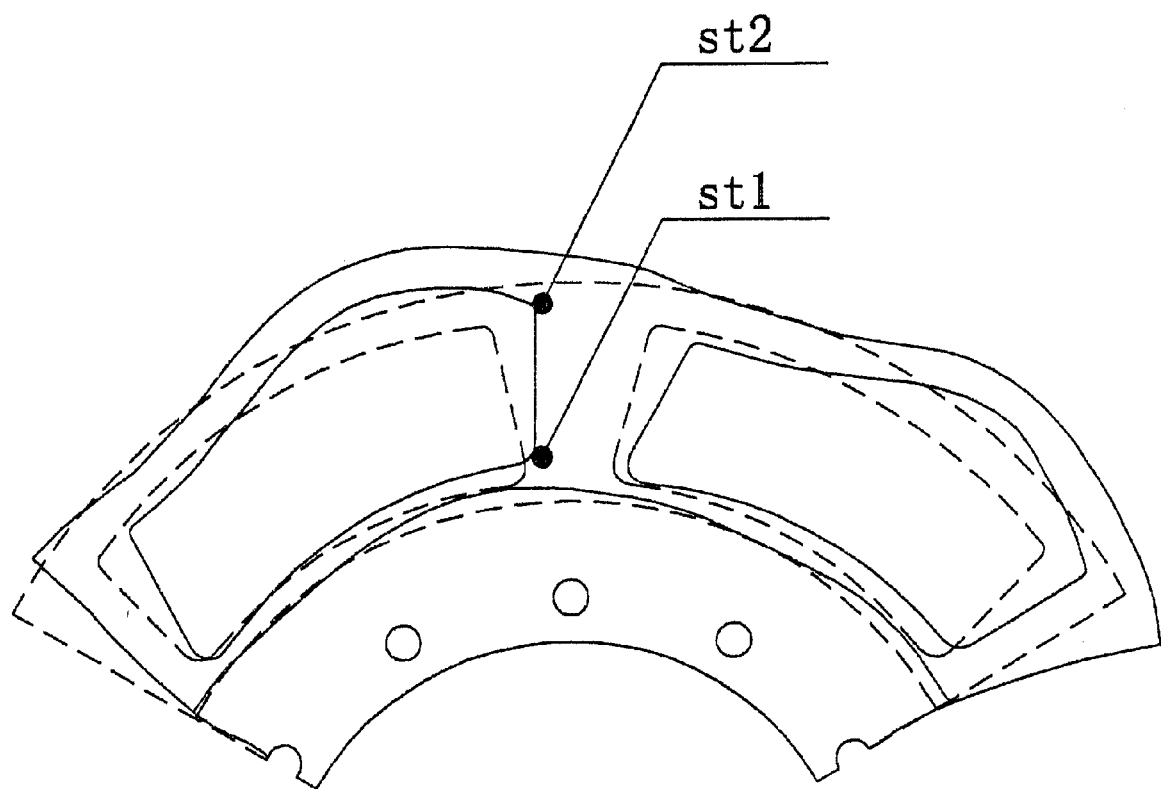
FIG. 7 is an enlarged partial right side elevational view of the prior art hub flange illustrated in FIG. 6 showing a result of strength analysis.
Figure 9:
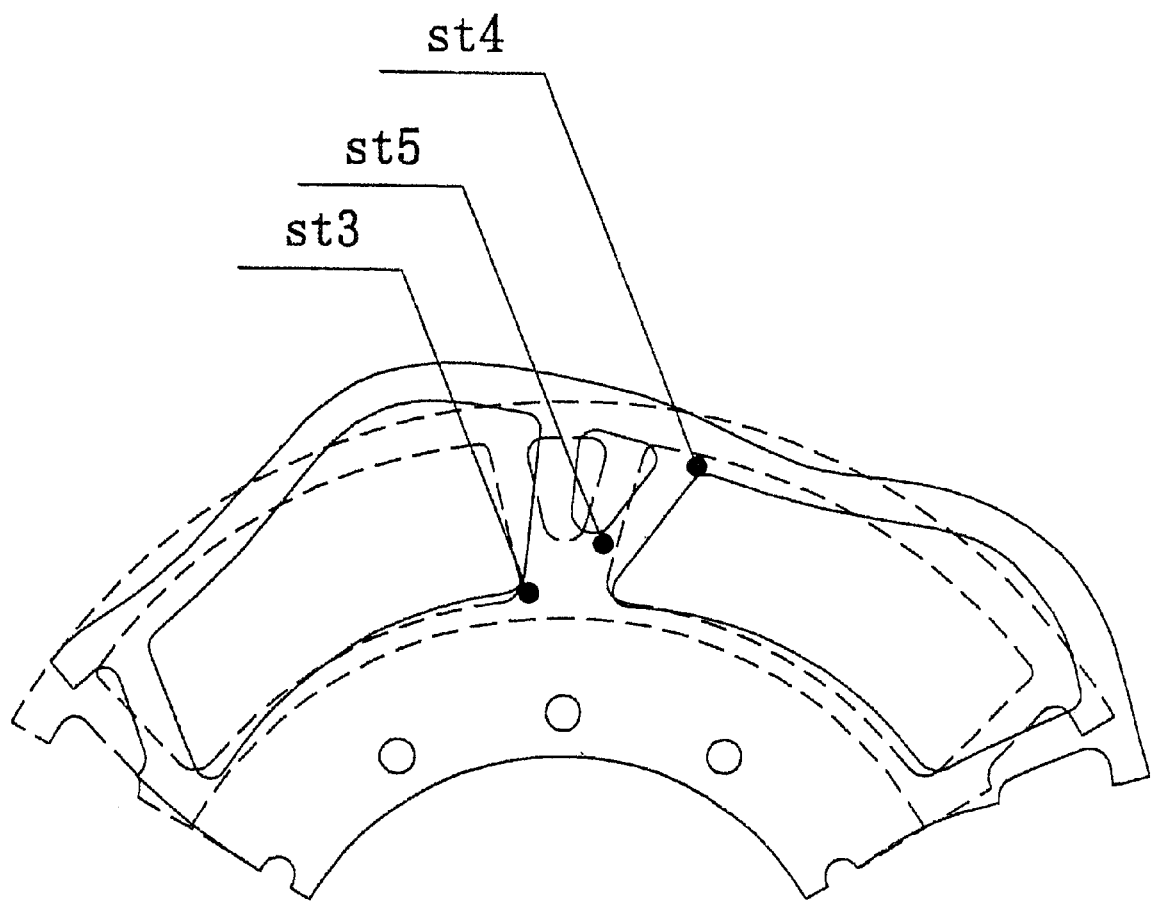
FIG. 9 is an enlarged partial right side elevational view of the hub flange illustrated in FIGS. 5 and 8 in accordance with an embodiment of the present invention showing a result of strength analysis.

FIGS. 7 and 9 show results of the strength analysis for the prior art hub flange and the inventive hub flange 53, respectively. Specifically, in FIGS. 7 and 9, dotted lines represent the shapes of the prior art hub flange and the inventive hub flange 53, respectively, before deformation by the described loads. The solid lines of FIGS. 7 and 9 represent the shapes of the respective hub flanges after the deformation caused by the described loads. The magnitude of deformation is multiplied by a certain factor for purposes of clarity of understanding. In other words, the deformation of the respective hub flanges is exaggerated in FIGS. 7 and 9 for illustration purposes. With reference to the prior art hub flange in FIG. 7, the corners of the window holes in the prior art hub flange have relatively large principal stress values. Specifically, the principal stresses st1 and st2 are observed at these corners. The principal stress st1 represents the maximum principal stress. If the maximum principal stress st1 is considered to be 100%, the principal stress st2 would be about 80% of the maximum principal stress st1 for the prior art hub flange. With reference now to FIG. 9, the corners of the window holes 58 in the inventive hub flange 53 have relatively large principal stress values like those of the prior art hub flange. Additionally, relatively large principal stress values are also observed at the peripheral regions of the newly added openings 59. The principal stresses st3 and st4 are observed at the corners of window holes 58, and the principal stress st5 is observed at the peripheral region of the opening 59 for the inventive hub flange 53. If the maximum principal stress st1 of the prior art hub flange is considered to be 100%, the principal stresses st3, st4 and st5 of the inventive hub flange 53 would be about 80%, 59% and 53% of the maximum principal stress st1, respectively.

The described strength analyses for the prior art hub flange and the inventive hub flange 53, which were conducted under substantially the same load conditions and the same restricting conditions, indicate that the inventive hub flange 53 with the openings 59 has smaller maximum principal stress in comparison to that of the prior art hub flange without the openings 59. Therefore, providing the openings 59 not only reduces the weight of the hub flange 53 but also reduces the maximum principal stress value for the hub flange 53. This result can be explained as follows. The presence of openings 59 may adversely reduce the rigidity of the intermediate regions between the adjacent window holes 58, so that more stresses can be applied to the peripheral region of each of the window holes 58 from the corresponding torsion springs 54. However, the presence of openings 59 also advantageously reduces the weight of the intermediate regions between the adjacent window holes 58. This weight reduction of the intermediate regions of the hub flange 53 advantageously reduces the centrifugal force that is proportional to the weight of the intermediate regions. Therefore, the amount of stresses applied to the peripheral region of each window hole 58 by this centrifugal force is accordingly reduced, resulting in reduction of the total amount of stress applied to the peripheral region of each window hole 58. Since a large proportion of the stresses applied to the corners of the window holes 58 is considered to be stress due to the centrifugal force of the intermediate regions, the presence of openings 59 in the intermediate regions between the adjacent window holes 58 can advantageously reduce the described principal stress values.

As described above, providing the openings 59 of the inventive hub flange 53 reduces the maximum principal stress and therefore can improve the strength of the hub flange 53 in comparison to the prior art hub flange. This improved strength makes it possible to reduce the thickness of the inventive hub flange 53 while attaining substantially the same maximum principal stress level as that of the prior art hub flange. Therefore, a hub flange, which has reduced weight achieved by the reduction of the hub flange thickness and by providing the openings 59, can be provided that attains the same strength as that of the prior art hub flange.

Additionally, in the hub flange 53 of this embodiment, each of the openings 59 is arranged at an outer peripheral part of the intermediate region between the adjacent window holes 58 in an alternating fashion. The applied centrifugal force is greater at the outer peripheral part of the intermediate region than at any other part of the intermediate region. Therefore, the centrifugal force of the intermediate regions between the adjacent window holes 58 is reduced, the reduction of the rigidity is minimized, and the stresses at the peripheral region of each window hole 58 is reduced due to the presence of openings 59.

Also, the annular outer peripheral section 61 extends continuously and circumferentially around the perimeter of hub flange 53 at a position radially outward of the window holes 58 and the openings 59. The outer peripheral section 61 is utilized so that adequate strength of the hub flange 53 is maintained despite the weight reduction of the hub flange 53.

DRIVE MEMBER

Figure 10:
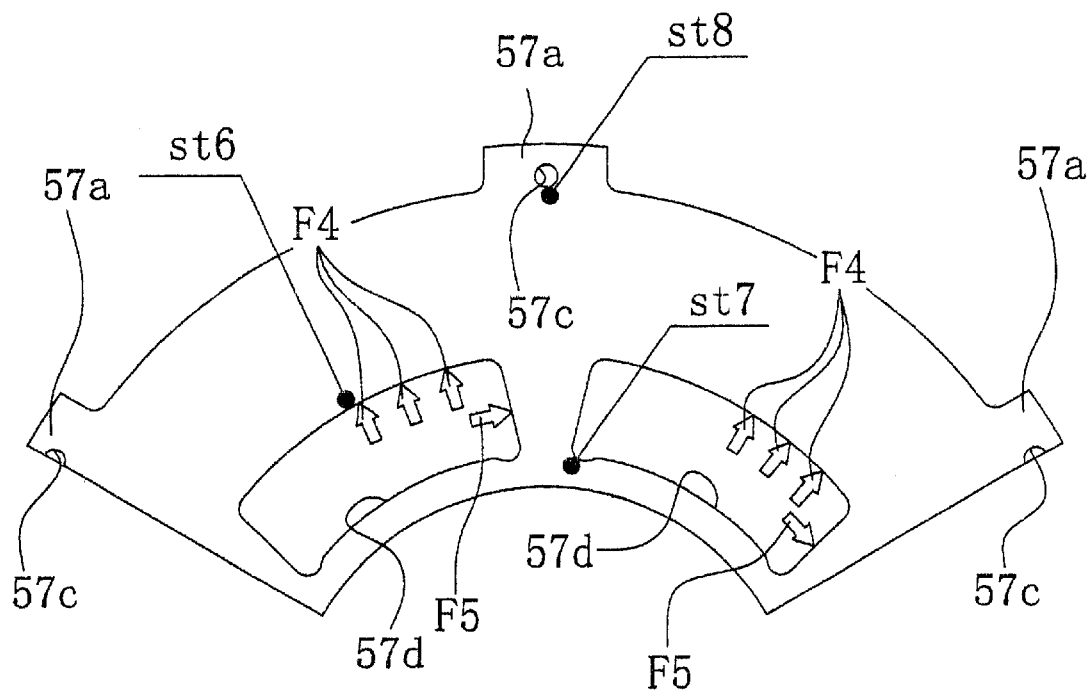
FIG. 10 is an enlarged partial right side elevational view of a prior art retaining plate showing both conditions of and a result of strength analysis.

As described above, the inventive drive member 52 (i.e., the clutch plate 56 and the retaining plate 57) of the lock-up damper 45 has a plurality of cutouts 56e and 57e, which are not found in the prior art drive member of FIG. 10. As a result of providing cutouts 56e and 57e, the weight of the drive member, the lock-up damper 45 and, therefore, the weight of the torque converter 1 are respectively reduced. Additionally, as described in greater detail below, the presence of cutouts 56e and 57e may result in a greater maximum principal stress value of the inventive drive member 52 in comparison to that of the prior art drive member without the cutouts 56e and 57e. However, the difference between the maximum principal stress value of the inventive drive member 52 and the maximum principal stress value of the prior art drive member is not considered to be significant when compared with the relatively large weight reduction achieved with the inventive drive member 52 (i.e., clutch plate 56 and retaining plate 57).

Referring initially to the retaining plate 57, a difference of a principal stress value between the inventive retaining plate 57 having the plurality of cutouts 57e and the prior art retaining plate without the cutouts 57e will be explained. Specifically, during operation (rotation) of the lock-up damper 45, the centrifugal force is applied to both the retaining plate 57 and the torsion springs 54. Additionally, the forces of the torsion springs 54 are applied to the peripheral surfaces of the corresponding window holes 57d of the retaining plate 57. More specifically, the centrifugal force that is proportional to the weight of the retaining plate 57, the centrifugal force of the torsion springs 54 that outwardly presses the outer peripheral surfaces of the corresponding window holes 57d, and the circumferential reaction forces of the torsion springs 54 that press the circumferential end surfaces of the corresponding window holes 57d are applied to the retaining plate 57.

Figure 11:
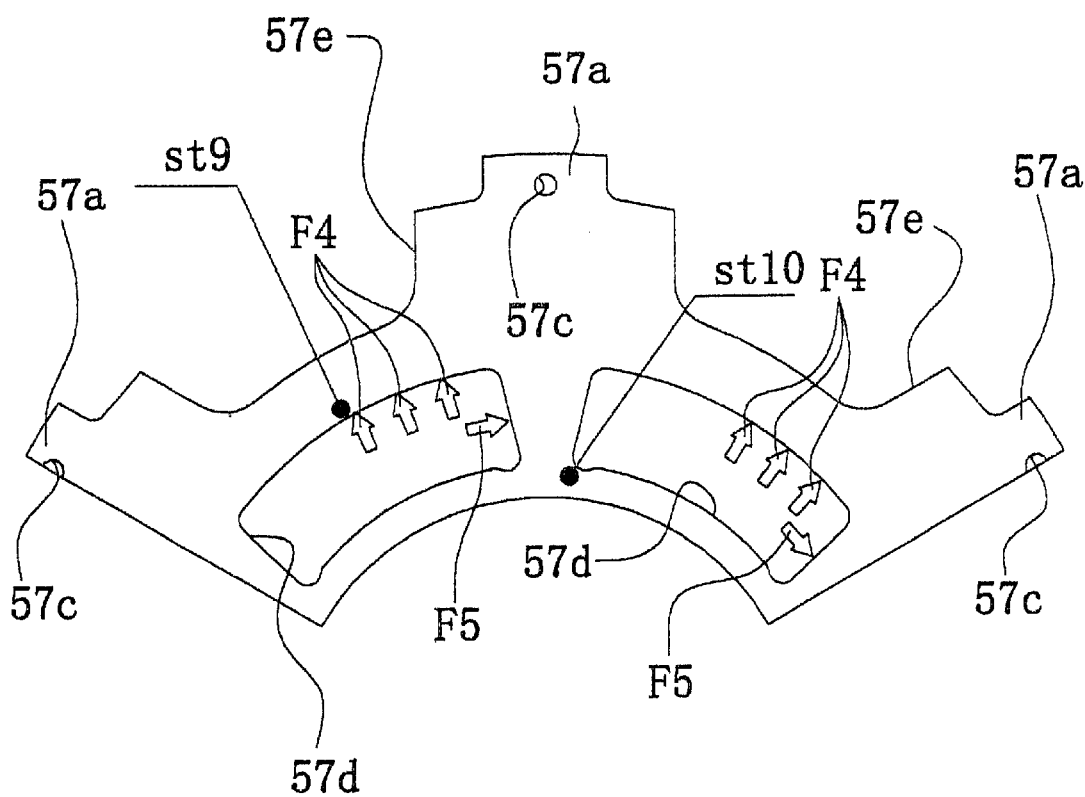
FIG. 11 an enlarged partial right side elevational view of the retaining plate illustrated in FIG. 4 in accordance with an embodiment of the present invention showing both conditions of and a result of strength analysis.

Strength analysis according to a finite element method was conducted with the described load conditions for both the prior art retaining plate without the cutouts 57e and the inventive retaining plate 57 with the cutouts 57e. FIGS. 10 and 11 show the above described load conditions of the strength analysis for these retaining plates, respectively. Specifically, in both FIGS. 10 and 11, symmetrical load conditions are applied to the interfaces (i.e., the left and right circumferential end surfaces of each retaining plate) while each retaining plate is fixed at the circular holes 57c. Additionally, the loads indicated with arrows F4, F5 and the centrifugal force that is proportional to the weight of each retaining plate are applied to the respective retaining plates. The load indicated with the arrows F4 represents the centrifugal force of the torsion springs 54 that presses outwardly against the outer peripheral surfaces of the corresponding window holes 57d. The load indicated with the arrows F5 represents the reaction forces of the torsion springs 54 that press the circumferential end surfaces of the corresponding window holes 57d.

With reference to FIG. 10, the peripheral regions of the window holes 57d and the peripheral regions of the circular holes 57c of the prior art retaining plate have relatively large principal stress values. Specifically, the principal stresses st6 and st7 are observed at the peripheral regions of the window holes 57d, and the principal stress st8 is observed at the peripheral regions of the circular holes 57c. The principal stress st8 represents the maximum principal stress. If the maximum principal stress st8 is considered to be 100%, the principal stresses st6 and st7 would be about 91% and 89% of the maximum principal stress st8, respectively.

Turning now to the case of the inventive retaining plate 57 shown in FIG. 11, although relatively large principal stresses are observed at the peripheral regions of the window holes 57d, relatively small principal stresses are observed at the peripheral regions of the circular holes 57c. Specifically, the principal stresses st9 and st10 are observed at the peripheral regions of the window holes 57d, as shown in FIG. 11. If the maximum principal stress st8 of the prior art retaining plate is considered to be 100%, the principal stresses st9 and st10 of the inventive retaining plate 57 would be about 178% and 166% of the maximum principal stress st8, respectively.

The described strength analyses, which were conducted under substantially the same load conditions and the same restricting conditions for the prior art retaining plate and inventive retaining plate 57, indicate that the inventive retaining plate 57 with the cutouts 57e has larger maximum principal stress value in comparison to that of the prior art retaining plate without the cutouts 57e. However, the maximum principal stress value of the inventive retaining plate 57 is less than twice the maximum principal stress value st8 of the prior art retaining plate. Accordingly, if appropriate countermeasures, such as partial reinforcement of peripheral walls of the window holes 57d in the retaining plate 57 shown in FIG. 4 are utilized, the maximum principal stress values of the inventive retaining plate 57 can be limited within an allowable stress range.

Preferably, clutch plate 56 is similar to retaining plate 57 as shown in FIGS. 3 and 4. Therefore, a detailed strength analysis of the inventive clutch plate 56 compared to a prior art clutch plate will not be discussed or illustrated in detail herein.

As described above, the weight of clutch plate 56 and the weight of the retaining plate 57 are greatly reduced by providing the relatively large cutouts 56e and 57e. However, the respective strengths of the clutch plate 56 and the retaining plate 57 are not significantly reduced when cutouts 56e and 57e are provided therein. Therefore, satisfactory strength of the clutch plate 56 and retaining plate 57 can be obtained by taking the relatively minor counter measures such as the described partial reinforcement.

SECOND EMBODIMENT

The clutch plate 56 and the retaining plate 57 both having a plurality of cutouts 56e and 57e are utilized in the above described first embodiment. However, a retaining plate 157 of FIG. 12 having a plurality of elongated holes (openings) 57g instead of the cutouts 57e and a clutch plate (not shown) having a plurality of elongated holes instead of the cutouts 56e can be alternatively utilized.

Since the structure of a clutch plate having a plurality of elongated holes is similar to that of the retaining plate 157 having the plurality of elongated holes 57g the structure of the clutch plate having the elongated holes will not be described or illustrated in detail herein.

The retaining plate 157 has a plurality of radially outwardly extending projections 57a along the outer peripheral region thereof. Preferably, the retaining plate 157 has six projections. Each projection 57a has a hole 57c through which a rivet 55 is received to attach the retaining plate 157 to a clutch plate via opposing projections. A plurality of window holes (receiving openings) 57d for receiving corresponding torsion springs 54 are formed at the inner peripheral region of the retaining plate 157. Preferably, retaining plate 157 has six window holes 57d. A plurality of cut and bent sections (projections) 57b are arranged at both radially inward and outward edges of each of the window holes 57d.

Retaining plate 157 is also provided with a plurality of elongated holes 57g. The elongated holes 57g are arranged at radially outward positions relative to the window holes 57d in the retaining plate 157. Preferably, retaining plate 157 has six elongated holes 57g. An area of each elongated hole 57g is typically set in a range of about 25% to 50% of an area of a corresponding window hole 57d located radially inward of the elongated hole 57g. Preferably, the area of each of the elongated holes 57g in this particular embodiment is set to be about 40% of the corresponding window holes 57d.

As described above, the retaining plate 157 shown in FIG. 12 has the plurality of elongated holes 57g that are not found in the prior art retaining plate of FIG. 10. The clutch plate (not shown) also has similar elongated holes. Providing a retaining plate 157 and/or a clutch plate (not shown) with these elongated holes reduces the weight of the drive member, the lock-up damper 45 and, therefore, the weight of the torque converter 1, respectively. Additionally, as described in greater detail below, providing the elongated holes may adversely result in greater maximum principal stress value for the inventive drive member 52 in comparison to that of the prior art drive member without the elongated holes. However, the difference between the maximum principal stress value of the inventive drive member 52 and the maximum principal stress value of the prior art drive member is not considered to be significant when compared with the relatively large weight reduction achieved with the inventive drive member 52.

Referring now to the retaining plate 157, a difference of a principal stress value between the inventive retaining plate 157 having the plurality of elongated holes 57g and the prior art retaining plate without the elongated holes 57g will be explained. Specifically, during operation (rotation) of the lock-up damper 45, the centrifugal force is applied to both the retaining plate 157 and the torsion springs 54. Additionally, the forces of the torsion springs 54 are applied to the peripheral surfaces of the corresponding window holes 57d of the retaining plate 157. More specifically, the centrifugal force that is proportional to the weight of the retaining plate 157 is applied to the retaining plate 157. The centrifugal force of the torsion springs 54 that outwardly presses the outer peripheral surfaces of the corresponding window holes 57d is also applied to the retaining plate 157. Finally, the circumferential reaction forces of the torsion springs 54 that press the circumferential end surfaces of the corresponding window holes 57d is also applied to the retaining plate 157.

Figure 13:
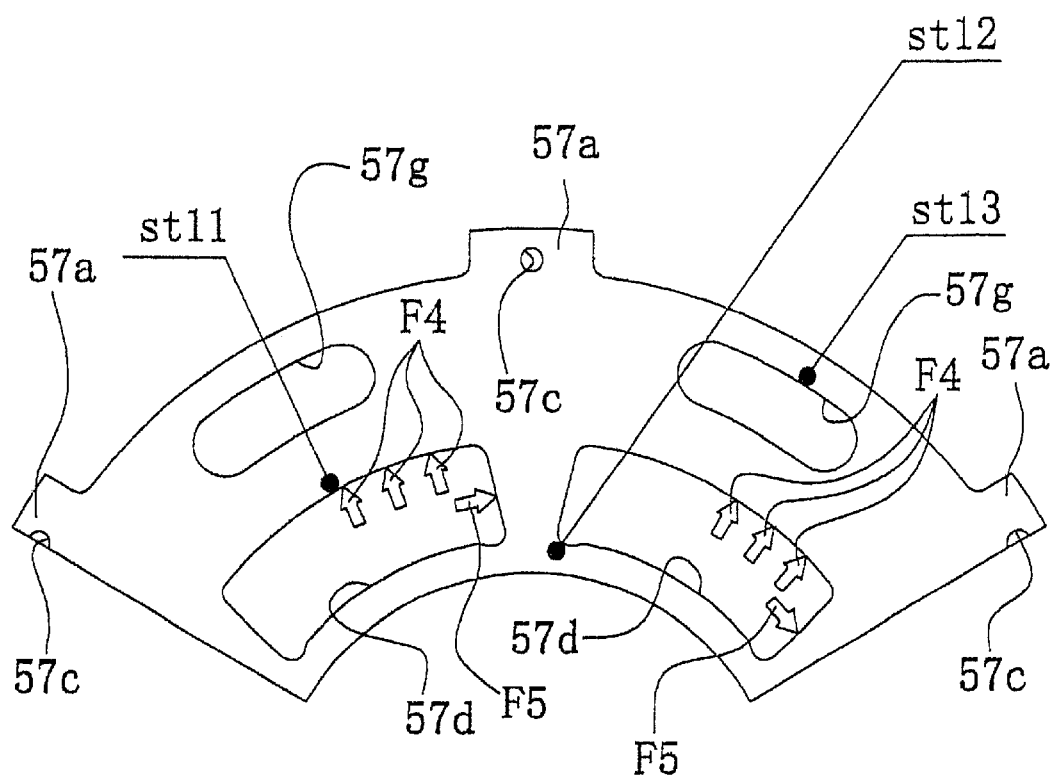
FIG. 13 is an enlarged partial right side elevational view of the retaining plate illustrated in FIG. 12 in accordance with a second embodiment of the present invention showing both conditions of and a result of strength analysis.

Strength analysis according to a finite element method was conducted with the described load conditions for both the prior art retaining plate without the elongated holes 57g and the inventive retaining plate 157 with the elongated holes 57g. FIGS. 10 and 13 show the above described load conditions of the strength analysis for these retaining plates, respectively. Specifically, in both FIGS. 10 and 13, symmetrical load conditions are applied to the interfaces (i.e., the left and right circumferential end surfaces of each retaining plate) while each retaining plate is fixed at the circular holes 57c. Additionally, the loads indicated with arrows F4, F5 and the centrifugal force that is proportional to the weight of each retaining plate is applied to the respective retaining plates. The load indicated with the arrows F4 represents the centrifugal force of the torsion springs 54 that presses outwardly against the outer peripheral surfaces of the corresponding window holes 57d. The load indicated with the arrows F5 represents the reaction forces of the torsion springs 54 that presses the circumferential end surfaces of the corresponding window holes 57d.

With reference to FIG. 10, the peripheral region of the window holes 57d and the peripheral region of the circular holes 57c of the prior art retaining plate have relatively large principal stress values. Specifically, the principal stresses st6 and st7 are observed at the peripheral regions of the window holes 57d, and the principal stress st8 is observed at the peripheral regions of the circular holes 57c. The principal stress st8 represents the maximum principal stress. If the maximum principal stress st8 is considered to be 100%, the principal stresses st6 and st7 would be about 91% and 89% of the maximum principal stress st8, respectively.

Turning now to the case of the inventive retaining plate 157 shown in FIG. 13, although relatively large principal stresses are observed at the peripheral regions of the window holes 57d, relatively small principal stresses are observed at the peripheral regions of the circular holes 57c. Additionally, relatively large principal stresses are also observed at the peripheral regions of the elongated holes 57g of the retaining plate 157. The principal stresses st11 and st12 are observed at the peripheral regions of the window holes 57d, as shown in FIG. 13. Furthermore, the principal stress st13 is observed at the peripheral regions of the elongated holes 57g as also shown in FIG. 13. If the maximum principal stress st8 of the prior art retaining plate is considered to be 100%, the principal stresses st11, st12 and st13 of the inventive retaining plate 157 would be about 122%, 110% and 104% of the maximum principal stress st8, respectively.

Figure 12:
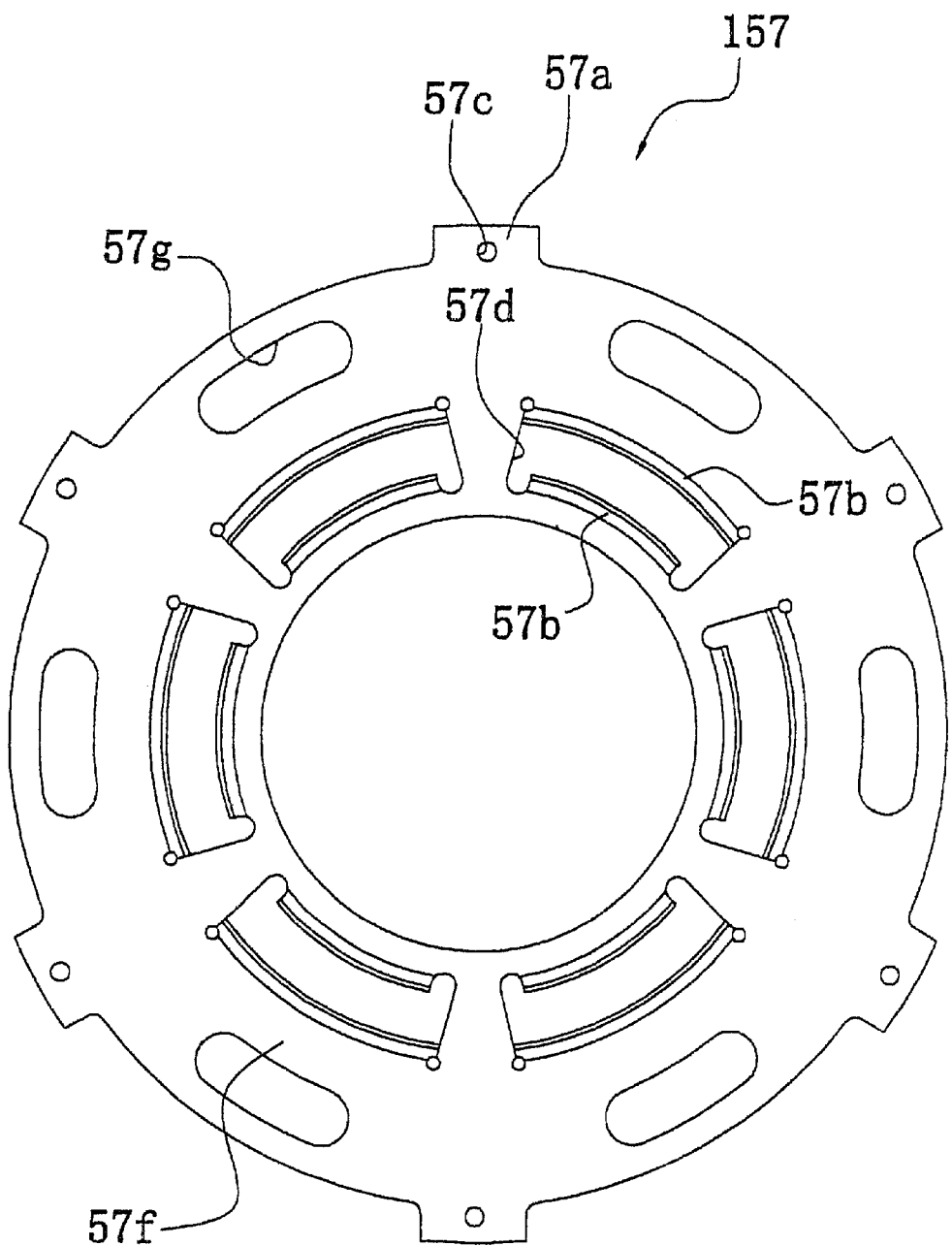
FIG. 12 is right side elevational view of a retaining plate of a torque converter in accordance with a second embodiment of the present invention.

The described strength analyses, which were conducted under substantially the same load conditions and the same restricting conditions for the prior art retaining plate and inventive retaining plate 157, indicate that the inventive retaining plate 157 with the elongated holes 57g has larger maximum principal stress value in comparison to that of the prior art retaining plate without the elongated holes 57g. However, the maximum principal stress value of the inventive retaining plate 157 is increased only about 20% of the maximum principal stress value st8 of the prior art retaining plate. Accordingly, if appropriate countermeasures, such as partial reinforcement of peripheral walls of the window holes 57d in the retaining plate 157 having the elongated holes 57g shown in FIG. 12 are utilized, the maximum principal stress values of the inventive retaining plate 157 can be limited within an allowable stress range.

Since a clutch plate having elongated holes is similar to the retaining plate 157, a detailed strength analysis of the clutch plate with elongated holes will not be discussed or illustrated in detail herein.

As described above, the weight of the retaining plate 157 and the weight of a similar clutch plate are greatly reduced by providing the elongated holes. However, the respective strengths of the retaining plate 157 and the similar clutch plate are not significantly reduced when the elongated holes are provided therein. Therefore, satisfactory strength of the retaining plate 157 and the similar clutch plate can be obtained by taking the relatively minor counter measures such as the described partial reinforcement.

In summary, in accordance with the present invention, the weight of the lock-up damper can be reduced by providing holes or cutouts in the input member at radially outward positions of the receiving openings while stresses at the peripheral regions of the receiving openings are limited within an allowable stress range. The weight of the lock-up damper can also be reduced by providing openings circumferentially spaced between the receiving openings and reducing the thickness of the output member while stresses at the peripheral regions of the receiving openings are limited within an allowable stress range. As a result, the weight of the lock-up damper and, therefore, the weight of the torque converter can be respectively reduced without sacrificing their respective strengths.

While only two embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A lock-up damper arranged in a lock-up mechanism of a torque converter for mechanically transmitting torque from an rotatable input body to a rotatable output body, said lock-up damper comprising:

an input member adapted to receive torque from the rotatable input body;

an output member adapted to output torque to the rotatable output body from said input member; and elastic members operatively coupled between said input member and said output member to dampen vibrations, said input member and said output member both including a plurality of receiving openings with said elastic members disposed therein, and at least one of said input and output members having circumferentially extending outer notched sections, each of said notched sections located in an area circumferentially aligned with said receiving openings, and cutouts located in an area radially outwardly of said receiving openings and radially inwardly of said notched sections to reduce weight and centrifuigal force such that an increase in a maximum principal stress is minimized.

2. A lock-up damper according to claim 1, wherein said at least one of said input and output members with said cutouts is an annular member having a continuous annular section that extends continuously in a circular path and that is positioned radially between said cutouts and said receiving openings.

3. A lock-up damper according to claim 2, wherein said at least one of said input and output members having said cutouts includes two disk-like members, with each of said two disk-like members having said cutouts.

4. A lock-up damper according to claim 3, wherein each of said two disk-like members includes said receiving openings with projections for retaining said elastic members therein, said elastic members being circumferentially positioned within said receiving openings.

5. A lock-up damper according to claim 1, wherein said at least one of said input and output members having said cutouts includes two disk-like members, with each of said two disk-like members having said cutouts.

6. A lock-up damper according to claim 5, wherein each of said two disk-like members includes said receiving openings with projections for retaining said elastic members therein, said elastic members being circumferentially positioned within said receiving openings.

7. A lock-up damper arranged in a lock-up mechanism of a torque converter for mechanically transmitting torque from an rotatable input body to a rotatable output body, said lock-up damper comprising:

an input member adapted to receive torque from the rotatable input body;

an output member adapted to output torque to the rotatable output body from said input member; and elastic members operatively coupled between said input member and said output member to dampen vibrations, said input member and said output member both including a plurality of receiving openings with said elastic members disposed therein, and at least one of said input and output members having cutouts located in an area radially outwardly of said receiving openings to reduce weight and centrifugal force such that an increase in a maximum principal stress is minimized, said cutouts of said at least one of said input and output members being located at its outer peripheral edge to form notches having an area that is greater than 80% of an area of said receiving openings.

8. A lock-up damper according to claim 7, wherein said at least one of said input and output members with said notches is an annular member having a continuous annular section that extends continuously in a circular path and that is positioned radially between said notches and said receiving openings.

9. A lock-up damper according to claim 8, wherein said at least one of said input and output members having said notches includes two disk-like members, with each of said two disk-like members having said notches.

10. A lock-up damper according to claim 9, wherein each of said two disk-like members includes said receiving openings with projections for retaining said elastic members therein, said elastic members being circumferential positioned within said receiving openings.

11. A lock-up damper according to claim 7, wherein said at least one of said input and output members having said notches includes two disk-like members, with each of said two disk-like members having said notches.

12. A lock-up damper according to claim 11, wherein each of said two disk-like members includes said receiving openings with projections for retaining said elastic members therein, said elastic members being circumferentially positioned within said receiving openings.

13. A lock-up damper arranged in a lock-up mechanism of a torque converter for mechanically transmitting torque from an rotatable input body to a rotatable output body, said lock-up damper comprising:

an input member adapted to receive torque from the rotatable input body;

an output member adapted to output torque to the rotatable output body from said input member, and elastic members operatively coupled between said input member and said output member to dampen vibrations, said input member and said output member both including a plurality of receiving openings with said elastic members disposed therein, and at least one of said input and output members having cutouts located in an area radially outwardly of said receiving openings to reduce weight and centrifugal force such that an increase in a maximum principal stress is minimized, said cutouts of said at least one of said input and output members being spaced inwardly from its outer peripheral edge to form holes having an area that is greater than 25% of an area of said receiving openings.

14. A lock-up damper according to claim 13, wherein said at least one of said input and output members with said holes is an annular member having a continuous annular section that extends continuously in a circular path and that is positioned radially between said holes and said receiving openings.

15. A lock-up damper according to claim 14, wherein said at least one of said input and output members having said holes includes two disk-like members, with each of said two disk-like members having said holes.

16. A lock-up damper according to claim 15, wherein each of said two disk-like members includes said receiving openings with projections for retaining said elastic members therein, said elastic members being circumferential positioned within said receiving openings.

17. A lock-up damper according to claim 13, wherein said at least one of said input and output members having said holes is includes two disk-like members, with each of said two disk-like members having said holes.

18. A lock-up damper according to claim 17, wherein each of said two disk-like members includes said receiving openings with projections for retaining said elastic members therein, said elastic members being circumferentially positioned within said receiving openings.

19. A lock-up damper arranged in a lock-up mechanism of a torque converter for mechanically transmitting torque from a rotatable input body to a rotatable output body, said lock-up damper comprising:

an input member adapted to receive torque from the rotatable input body;

an output member adapted to output torque to the rotatable output body from said input member; and elastic members operatively coupled between said input member and said output member to dampen vibrations, said input member and said output member both including a plurality of receiving openings with radially inward and outward edges and said elastic members disposed therein, and at least one of said input and output members having holes located in areas that are circumferentially arranged between said receiving openings, each of said holes having an outer circumferential periphery substantially radially aligned with said radially outward edges of said receiving openings and an inner periphery spaced radially outwardly from said radially inner edges of said receiving openings to reduce weight and centrifugal force such that an increase in a maximum principal stress is minimized, said outer periphery of each of said holes having a circumferential width larger than said inner periphery.

20. A lock-up damper according to claim 19, wherein said at least one of said input and output members having said holes is an annular member that is restricted from radial movement at an inner peripheral region thereof, said inner peripheral region being arranged radially inward of said receiving openings.

21. A lock-up damper according to claim 20, wherein said hole is arranged at an outer peripheral part of an intermediate region, said intermediate region being located circumferentially between said receiving openings.

22. A lock-up damper according to claim 19, wherein said at least one of said input and output members having said holes is an annular member having an annular outer peripheral section that extends continuously in a circular path around said annular member, and that is positioned radially outwardly of said hole.

23. A lock-up damper according to claim 20, wherein said at least one of said input and output members having said holes is an annular member having an annular outer peripheral section that extends continuously in a circular path around said annular member, and that is positioned radially outwardly of said hole.

24. A lock-up damper according to claim 21, wherein said at least one of said input and output members having said holes is an annular member having an annular outer peripheral section that extends continuously in a circular path around said annular member, and that is positioned radially outwardly of said hole.

25. A lock-up damper according to claim 19, wherein said holes are arranged in said output member, said output member having an annular member with an inner peripheral region that is positioned radially inward of said receiving openings and connected to said output member.

26. A lock-up damper according to claim 20, wherein said holes are arranged in said output member, said output member having an annular member with an inner peripheral region that is positioned radially inward of said receiving openings and connected to said output member.

27. A lock-up damper according to claim 21, wherein said holes are arranged in said output member, said output member having an annular member with an inner peripheral region that is positioned radially inward of said receiving openings and connected to said output member.

28. A lock-up damper according to claim 22, wherein said holes are arranged in said output member, said output member having an annular member with an inner peripheral region that is positioned radially inward of said receiving openings and connected to said output member.

29. A lock-up damper according to claim 23, wherein said holes are arranged in said output member, said output member having an annular member with an inner peripheral region that is positioned radially inward of said receiving openings and connected to said output member.

30. A lock-up damper according to claim 24, wherein said holes are arranged in said output member, said output member having an annular member with an inner peripheral region that is positioned radially inward of said receiving openings and connected to said output member.

\* \* \* \* \*